United States Patent
Tan et al.

(10) Patent No.: US 8,634,300 B2
(45) Date of Patent: Jan. 21, 2014

(54) REDUCING COMMUNICATION DELAY OF VIDEO DATA

(75) Inventors: Wai-Tian Tan, Sunnyvale, CA (US); Andrew J. Patti, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 81 days.

(21) Appl. No.: 13/386,633

(22) PCT Filed: Aug. 31, 2009

(86) PCT No.: PCT/US2009/055508
§ 371 (c)(1),
(2), (4) Date: Jan. 23, 2012

(87) PCT Pub. No.: WO2011/025502
PCT Pub. Date: Mar. 3, 2011

(65) Prior Publication Data
US 2012/0120254 A1     May 17, 2012

(51) Int. Cl.
*H04N 7/24* (2011.01)
*H04N 17/00* (2006.01)

(52) U.S. Cl.
USPC .......................................... 370/235

(58) Field of Classification Search
USPC ........................ 370/235, 412, 429
See application file for complete search history.

(56) References Cited

U.S. PATENT DOCUMENTS

| | | | |
|---|---|---|---|
| 6,359,883 B1 * | 3/2002 | Lechleider | 370/389 |
| 6,493,388 B1 | 12/2002 | Wang | |
| 7,372,903 B1 | 5/2008 | Lee et al. | |
| 7,496,236 B2 | 2/2009 | Fogg | |
| 7,508,990 B2 | 3/2009 | Pace | |
| 2003/0067877 A1 | 4/2003 | Sivakumar et al. | |
| 2006/0095942 A1 | 5/2006 | van Beek | |
| 2006/0218264 A1 | 9/2006 | Ogawa et al. | |
| 2007/0237073 A1 * | 10/2007 | Jutzi | 370/229 |
| 2008/0032725 A1 * | 2/2008 | Usuda et al. | 455/509 |
| 2008/0117930 A1 | 5/2008 | Chakareski et al. | |
| 2008/0271069 A1 | 10/2008 | Kim et al. | |
| 2009/0103610 A1 * | 4/2009 | Puri | 375/240.03 |
| 2010/0020823 A1 * | 1/2010 | Bai et al. | 370/468 |

OTHER PUBLICATIONS

Electronics/Telecommunications;Video Data Transmittal Method Considering Buffer Capacity:KR 10-0686635 ~ Feb. 2007;;WO/SR.
Nicola Baldol et al;RTCP Feedback Based Transmission Rate Control for 3G Wireless . . . ;PIMRC 2004 15th IEEE Int'l Symposium Sep. 2004 vol. 3;1817-1821;WO/SR.
PCT Search Report and Written Opinion dated Aug. 9, 2010 ~ Application No. PCT/US2009/055508 ~ Internationai Filing Date ~ Aug. 31, 2009.

(Continued)

*Primary Examiner* — Mark Rinehart
*Assistant Examiner* — Ellen A Kirillova

(57) ABSTRACT

According to one embodiment, video data from a video transmitter (110) is received (420) at a network buffer (130). Information that pertains to a network buffer drain rate (14) of the network buffer (1q3) is monitored (430). The network buffer drain rate (140) is a rate that the video data is removed from the network buffer (130). The network buffer drain rate (140) is estimated (440) based on the monitored information. A transmission rate (120) that the video transmitter (110) transmits future video data is adjusted (450) to not exceed an allowed transmission rate (ATR) that is calculated based on the estimation of the network buffer drain rate (140).

14 Claims, 5 Drawing Sheets

(56) References Cited

OTHER PUBLICATIONS

Sunghoon Son:A Transmission Scheme for Streaming Variable Bit Rate Video Over Internet;Springer-Verlag 2001 (Berlin);16-28;WO/SR.

Extended European search report (and examination) in corresponding EP patent application 09848847.1, dated Jul. 22, 2013.

N. Baldo et al., "RTCP feedback based transmission rate control for 3G wireless multimedia streaming," Personal, Indoor & Mobile Radio Communications 2004, 15th IEEE Int'l Symp. thereon, Sep. 5-8, 2004.

* cited by examiner

REDUCING COMMUNICATION DELAY OF VIDEO DATA

BACKGROUND

A large number of people are buying high density televisions (HDTVs) and are watching high density (HD) videos on their HDTVs. A person can have a good viewing experience of HO video when the HD video data is transmitted over a well provisioned network with a wide bandwidth that can easily accommodate the high bit rate associated with HD video data. However, there is an increasing demand to transmit HD videos over constrained networks, for example, that are typically associated with a home, a small office, or a satellite office. The delay in transmitting HD videos over constrained networks can reach an order of a second. In the past, one solution has been to pre-fetch previously recorded HD videos. However, users are starting to request HD videos in real time over constrained networks. Since the HD videos are requested in real time, pre-fetching the HD videos is not an option. Further, delays of the order of a second are unacceptable when two end points are interactively communicating HD video with each other (also referred to herein as "conferencing").

BRIEF DESCRIPTION OF THE DRAWINGS

The accompanying drawings, which are incorporated in and form a part of this Description of Embodiments, illustrate various embodiments of the present invention and, together with the description, serve to explain principles discussed below.

The drawings referred to in this Brief Description should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the present Description of Embodiments, discussions utilizing terms such as "monitoring", "estimating," "adjusting," "providing," "calculating," "determining," "communicating," "transmitting," "receiving," "removing," "storing," "setting," "initializing," or the like, refer to the actions and processes of a computer system, or electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Some embodiments of the subject matter are also well suited to the use of other computer systems such as, for example, optical and virtual computers.

Various studies have shown that one of the main sources of constraint in delivering HD video is the packet delay and overflow loss due to a modem buffer in the data path delivering video data to a video receiver. A modem buffer is typically used to reduce packet dropping and improve network utilization; however, a modem buffer can introduce substantial delays, even in the absence of overflow, for example, on the order of one second. Although many of the embodiments herein are described in the context of a modem buffer, any one or more embodiments can be used with any type of network buffer that can introduce delays or can overflow, or a combination thereof.

Figure 1:
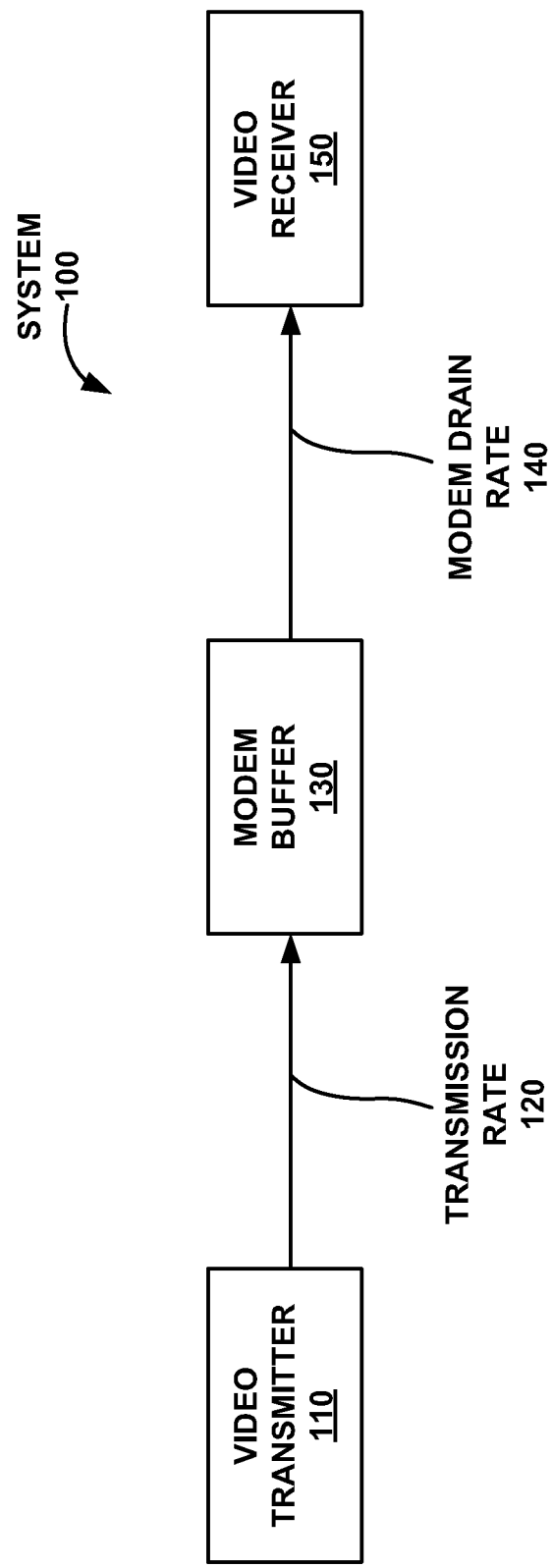
FIG. 1 depicts a block diagram of a system for reducing communication delay of video data, according to one embodiment.

FIG. 1 depicts a block diagram of a system for reducing communication delay of video data, according to one embodiment. The system 100 depicts a video transmitter 110, a modem buffer 130, a network 145, and a video receiver 150. The video transmitter 110 and the video receiver 150 may be electronic devices, such as lap tops, desk tops, or personal digital assistants (PDAs). According to one embodiment, an electronic device may be both a video transmitter 110 and a video receiver 150. Two electronic devices that have transmitters 110 and receivers 150 can transmit and receive video data from each other. For example, the two electronic devices may be Skype™ or Google™ chat end points that interact with each other. A video receiver 150 may have an HD display.

The modem buffer 130 and the video receiver 150 are associated with a constrained network such as a network that is typically used in a home or a small business, according to one embodiment, Video data can be transmitted over the constrained network from the modem buffer 130 to the video receiver 150. The modem includes a buffer 130 (also referred to as a "modem buffer") that the received data can be temporarily stored in until the data is removed from the modem buffer 130, in a first in first output manner, and transmitted to the video receiver 150. Cable, Digital Subscriber Line (DSL) or Worldwide Interoperability for Microwave Access (WiMax), among other things, may provide connectivity between the modem buffer 130 and the video receiver 150.

According to one embodiment, a modem buffer 130 is large enough to ensure high utilization for a given modem drain rate 140. For example, low delay can be achieved when the modem buffer 130's occupancy is low, but delay can reach a level of a second when the modem buffer 130's occupancy is high, Conventionally, neither video transmitters nor video receivers have information pertaining to either the occupancy or the drain rate of a modem buffer. Therefore, according to one embodiment, the rate 120 that data is transmitted (also known as "transmission rate") to the modem buffer 130 is adjusted based on an estimation of the rate 140 that data is removed from the modem buffer 130 (also known as "modem drain rate") so that the transmission rate 120 does not exceed the modem drain rate 140. According to one embodiment, a transmission rate 120 is calculated based on the average of a number of packets transmitted over a small number of video frame periods. According to another embodiment, the rate 120 that data is transmitted to the modem buffer 130 is adjusted based on an estimation of the modem buffer 130's occupancy (also known as "modem buffer occupancy") to reduce the probability of modem buffer build up. Therefore, according to various embodiments, the transmission rate 120 of video data can be controlled to reduce communication delay of video data.

Various studies have shown that one of the main sources of constraint in delivering HD video is the packet delay and overflow loss due to a network buffer in the data path delivering video data to a video receiver, A network buffer is typically used to reduce packet dropping and improve network utilization; however, a network buffer can introduce substantial delays, even in the absence of overflow, for example, on the order of one second. Examples of a network buffer include, among other things, a modem buffer, a router buffer and a "traffic shaping" buffer. The router buffer could reside in a network router. The "traffic shaping" buffer could reside in software, such as Linux™ networking stack. Although many of the embodiments herein are described in the context of a modem buffer, any one or more embodiments can be used with any type of network buffer that can introduce delays or can overflow, or a combination thereof.

Figure 2:
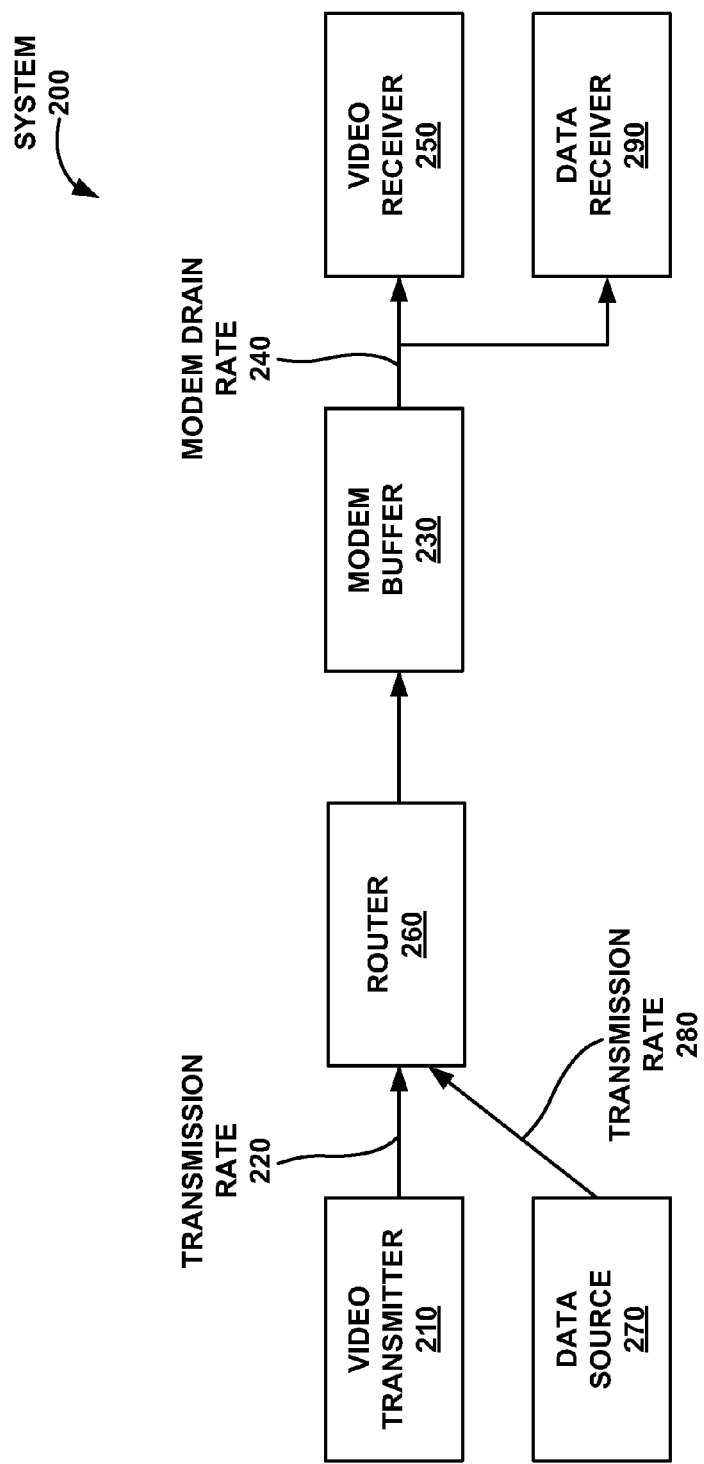
FIG. 2 depicts a block diagram of another system for reducing communication delay of video data, according to one embodiment, where the modem buffer receives data from a router.

FIG. 1 depicts a modem buffer 130 that receives data from one video transmitter 110. However, a modem buffer 130 may receive data from more than one source. FIG. 2 depicts a block diagram of another system 200 for reducing communication delay of video data, according to one embodiment, where the modem buffer 230 receives data from a router 260. The system 200 depicts a video transmitter 210, a data source 270, a router 260, a modem buffer 230, a network 245, a video receiver 250, and a data receiver 290. The data source 270 and the data receiver 290 are optional.

According to one embodiment, the router 260 is a Quality of Service (QOS) router 260. According to one embodiment, the router 260 receives data from a plurality of sources 210, 270. The video transmitter 210, the data source 270, the video receiver 250, and the data receiver 290 may be electronic devices, such as lap tops, desk tops, or PDAs. The video receiver 250 may have an HD display. Video transmitter 210, the data source 270, the router 260, and the modem buffer 230 are associated with a constrained network, such as a network that is typically used in a home or a small business, according to one embodiment. Cable, DSL or WiMax, among other things, may provide connectivity between the modem buffer 230 and the receivers 250, 290.

Data from the two sources 210, 270 are transmitted to the receivers 250, 290 through the router 260, the modem buffer 230, and the network 245. The video transmitter 210 transmits video data to the video receiver 250. The data source 270 transmits data, which may or may not be video data, to the data receiver 290. For example, the data source 270 may upload web pages to a data receiver 290, which is a web server.

The video transmitter 210 transmits video data at one transmission rate 220 and the data source 270 transmits data at another transmission rate 280. The video data from the video transmitter 210 is transmitted to the video receiver 250 and the data from the data source 270 is transmitted to the data receiver 290. The modem drain rate 240 is the total rate that data is received from the modem buffer 230, according to one embodiment. For example, the modem drain rate 240 could include the rate that data, regardless of which source 210, 270 transmitted it, is removed from the modem buffer 230. Conventionally, electronic devices, such as video transmitters, data sources, routers, video receivers, and data receivers, so not have information pertaining to either occupancy or drain rate of a modem buffer.

As stated herein, data sources, such as a video transmitter or a data source, video receivers, routers, and modem buffers, are conventionally not aware of either the occupancy or the drain rate of a modem buffer. Therefore, referring to FIGS. 1 and 2, according to one embodiment, the modem drain rate 140, 240 is estimated and the rate 120, 220 that video data is transmitted to the modem buffer 130, 230 is adjusted to not exceed an estimation of the modem drain rate 140, 240 in order to reduce communication delay of video data. According to one embodiment, the transmission rate 120, 220 of video data is adjusted to not exceed an allowed transmission rate that is calculated based on the estimation of the modem drain rate 140, 240, as will become more evident. Various methods can be used for estimating the modem drain rate 140, 240, as will become more evident.

The modem drain rate 140, 240 can be estimated and the transmission rate 120, 220 can be adjusted at various points in time. For example, the modem drain rate 140, 240 can be estimated and the transmission rate 120, 220 adjusted periodically. In a specific example, the estimation and adjustment can be performed at least twice during the transmission of the video data. In another example, the estimation and the adjustment can be performed continuously. More specifically, the information that pertains to modem drain rate 140, 240 can be continuously monitored, for example, using statistical analysis, such as a running average. If the statistically analysis indicates that the difference between the current estimation of the modem drain rate and the new estimation of the modem drain rate 140, 240 is statistically significant, then the transmission rate 120, 220 can be adjusted based on the new estimation of the modem drain rate 140, 240.

Further, the estimation of the modem drain rate 140, 240 can be used for determining a degree for adjusting the transmission rate 120, 220, according to one embodiment. For example, the transmission rate 120, 220 is increased more if the estimation of the modem drain rate 140, 240 increases by 50% verses 20%. In another example, the transmission rate 120, 220 is decreased more if the estimation of the modem drain rate 140, 240 decreases by 75% verses 50%.

Various embodiments are used for estimating modem drain rate 140, 240. For example, packet dispersion or timed data, such as time stamps, among other things, can be used for estimating modem drain rates 140, 240, as will become more evident.

As stated herein, packet dispersion is used, according to one embodiment, to estimate modem drain rate 140, 240 (referred to herein as the "dispersion embodiment"). For example still referring to FIGS. 1 and 2, a modem drain rate 140, 240 can be estimated using the amount of data divided by time. According to one embodiment, more than one packet generated per video packet burst is used in calculating packet dispersion, as will become more evident.

More specifically, assume that a frame of video data results in a burst of seven packets and those seven packets are in the modem buffer 130, 230. According to one embodiment, packet dispersion is the amount of time between the packets that are removed consecutively from a modem buffer 130, 230. For example, if the first packet is removed at time t1, the second packet is removed at time t2 and a third packet is removed at time t3, the dispersion between the first and second packets is the difference d1 between time t2 and time t1 and the dispersion between the second and third packets is the difference d2 between time t3 and time t2. In the example of the burst of seven packets for a video frame, there would be six differences d1-d6 between seven times t1-t7 that the seven packets are removed from the modem buffer 130, 230. According to one embodiment, modem drain rate 140, 240 can be estimated by dividing the average dispersion by the average packet size, In this case, the modem drain rate 140, 240 could be estimated by dividing the average of the differences d1-d6 between the times t1-t7 by the average size of the seven packets.

Generally, a receiver 150, 250 does not directly observe the times t1-t7. However, the times t1-t7 can be approximated by the receiver 150, 250 using the reception times of respective packets. Approximating times t1-t7 using reception times of respective packets is generally accurate since additional significant dispersions are unlikely. Further, in the rare event that additional significant dispersion does occur, the additional dispersion can be statistically controlled.

In one embodiment, a video transmitter 110, 210 generates video packets and records the sequence number and size in bytes of each of the video packets. The video transmitter 110, 210 also records the sequence number ranges indicating a packet burst. According to one embodiment, Real-time Transport Protocol (RTCP) reports are used for determining packet reception times, sequence number ranges, and video packet sizes, among other things. For example, the video receiver 150, 250 sends back to the video transmitter 110, 210 an extended RTCP packet including the reception status and time of each received video packet. The video transmitter 110, 210 then uses the reception status to determine bursts of received packets, and the reception times to estimate, for example, the times t1-t7 described herein.

In another embodiment, the router 260 monitors the video packet flow and records, for example in local memory, for each video packet the Real Time Transport Protocol (RTP) sequence number and the size in bytes, The router 260 also records sequence number ranges indicating packet bursts sent to the modem buffer 230, The video receiver 250 sends back to the video transmitter 210 an extended RTCP packet including the reception status and the time that each video packet is received. The router 260 uses the reception status and its stored burst information to determine bursts of received packets, along with the stored packet size and the reception times to estimate, for example, the times t1-t7 described herein.

In another embodiment, standard, instead of extended, RTP control protocol (RTCP) reports are used for determining packet reception times, sequence number ranges, and packet sizes, among other things. For example, a video transmitter 210 or router 260 records the sequence number ranges indicating packet burst, along with each video packet's RTP sequence number and the size in bytes. The video receiver 250 sends back to the video transmitter 210 a standard RTCP report. The video transmitter 210 or router 260 determines if the "fraction lost" field indicates that no packets are lost, and if the RTCP report covers packets in a single burst. If so, the amount of traffic sent can be determined by the amount of local storage on the router 260 or video transmitter 110, 210. The time "t7" for the end of the seven packet burst is estimated by the "NTP timestamp" field, and the time 11' for the start of the seven packet burst is estimated by the "NTP timestamp" field of the preceding RTCP report. As can be seen, various embodiments use more than one RTCP packet generated per video packet burst as a part of determining packet dispersion. Thus, as can be seen, packet dispersion information can be used for estimating a modem drain rate 140, 240.

According to one embodiment, "timed data" is used as a part of estimating the modem drain rate 140, 240. For example, information pertaining to when video data is transmitted or received is associated with packet time stamps or protocol reports, or a combination thereof. Examples of protocol reports include, but are not limited to, RTCP or RTP traffic or reports.

For example, according to one embodiment, round trip time is used in estimating either the modem drain rate 140, 240. More specifically, a video transmitter 110, 210 transmits a packet to the video receiver 150, 250. The time that the packet is transmitted shall be referred to as the packet transmission time. The video receiver 150, 250 receives the packet. The time that the video receiver 150, 250 received the transmitted packet shall be referred to as packet reception time. The video receiver 150, 250 responds to the video transmitter 110, 210 when it receives the packet. For example, the video receiver 150, 250 may respond immediately to the video transmitter 110, 210 when it receives the packet. In another example, the video receiver 150, 250 uses piggy backing to respond. The video transmitter 110, 210 receives the video receiver 150, 250's response. The response includes the packet transmission time that the video transmitter 110, 210 transmitted the packet to the video receiver 150. 250. The time that the video transmitter 110. 210 receives the response shall be referred to as "response received time." According to one embodiment, the round trip time can be calculated by subtracting the response received time from the packet transmission time.

According to one embodiment, variation in one-way delay is used to compute buffer occupancy. For example, each packet typically carries a packet transmission timestamp corresponding to when the packet is transmitted. For live conferencing applications using RTP transport, the packet transmission time stamp can be approximated by the media playback timestamp. A receiver 150, 250 can compute the difference between the packet reception time of each packet and its packet transmission time stamp to obtain a one-way delay estimate. Variation in one-way delay, which is of significant magnitude, can be used to manage buffer occupancy, according to one embodiment.

According to one embodiment, information from Transmission Control Protocol Acknowledgements (TCP ACKs) received at the router 260, for example, are used to calculate round trip times. For example, assuming that a TOP implementation that automatically generates ACK packets in a timely manner is used, a router 260 can receive a TOP ACK from a video transmitter 210, 270. The round trip time may be estimated by subtracting the last TCP packet transmission time from the received ACK time. The received ACK time is an example of "response received time." The last TCP packet transmission time is an example of packet transmission time.

According to another embodiment, information from two-way Real-time Transport Protocol (RTCP) traffic is used to calculate round trip time. For example, logic that resides at either the router 260 or the video transmitter 110, 210 could monitor standard RTP or RTCP information, or a combination thereof, to estimate either the modem drain rate 140, 240 or modem buffer occupancy. More specifically, the times that the RTP video packets are transmitted may be stored, for example, in local memory on the video transmitter 110, 210 or router 260. Continuing the example, the router 260 can receive RTCP feedback that the video receiver 150, 250 transmitted immediately after receiving a packet. The RTCP feed back will include the RTP sequence number designated in the "extended sequence number received" field in the RTCP report. The times that the RTP video packets are transmitted and the value from the "extended sequence number received" field from the RTCP report can be used to determine round trip time, according to one embodiment. A time that an RTP video packet is transmitted and a value from the "extended sequence number received" field are examples respectively of packet transmission time and packet reception time.

The packet transmission time, packet reception time, the response received time, size of packets, among other things, are examples of timed data information that can be used in determining modem drain rate. As described herein, the packets may be RTCP packets or TCP packets. As described herein, information such as packet transmission time, packet received time, response received time, size of packets, among other things, can be obtained from standard RTCP reports, extended RTCP reports or from TOP packets, among other things, as described herein. The timed data embodiment and the dispersion embodiment can be used separately or in combination with each other. For example, either the timed data embodiment or the dispersion embodiment can provide sufficient information to estimate a modem drain rate or modem buffer occupancy. Both the timed data embodiment and the dispersion embodiment can be used in conjunction with each other, for example, for the purposes of cross checking results, among other things. Similarly, either the modem drain rate or the modem buffer occupancy embodiment can be used together, for example, for the purpose of crossing check results, among other things. Thus, "timed data" as described herein can be used as a part of estimating the modem drain rate 140, 240.

According to one embodiment, modem buffer occupancy can be used as a part of adjusting a transmission rate. According to one embodiment, modem buffer occupancy can be used as a part of calculating an allowed adjusted transmission rate (ATR), as will become more evident. Referring to FIGS. 1 and 2, according to one embodiment, modem buffer occupancy equals the total amount of data injected into a modem buffer 130, 230 minus the amount of data that is drained and lost. Therefore, modem buffer occupancy can be used to directly determine the delay of a video communication, according to one embodiment. In one embodiment, the buffer occupancy is used to determine whether to adjust the transmission rate 120, 220, as will become more evident. In one embodiment, the buffer occupancy is estimated indirectly through a modem drain rate estimate, as described herein. According to one embodiment, either timed data or packet dispersion, or a combination thereof, as described herein, can be used as a part of estimating a buffer's occupancy.

According to one embodiment, an initial modem drain rate is calculated. For example, referring to FIGS. 1 and 2, toward the beginning of transmitting a stream of video data and after the modem buffer 130, 230 contains a sufficient amount of data, either the dispersion embodiment or the timed data embodiment can be used to determine an initial estimation of the modem drain rate. More specifically, since a modem 130, 230's input rate is typically much larger than a modem 130, 230's output rate, a data source, such as a video transmitter 110, 210 or a data source 270, could transmit consecutive packets associated with one slice or one frame of data in a burst of packets. The dispersion of the packets associated with the burst can be measured, for example, at the video receiver 150, 250 to estimate the initial modem drain rate.

The initial estimation of the modem drain rate 140, 240, according to one embodiment, is assumed to be the actual modem drain rate 140, 240. According to one embodiment, this initial estimation of the modem drain rate 140, 240 is used as an upper bound on future estimation of the modem drain rates 140, 240. According to one embodiment, if a future estimation of the modem drain rate 140, 240 is higher than the initial estimation of the modem drain rate 140, 240, the higher future estimation of the modem drain rate 140, 240 replaces the initial estimation of the modem drain rate 140, 240 as the upper bound.

According to one embodiment, the estimation of the modem drain rate 140, 240 is used as a part of adjusting the transmission rate 120, 220 that video data is transmitted to a modem buffer 130, 230. For example, an estimation of a modem drain rate 140, 240 can be used as a part of determining an allowed transmission rate (ATR). The transmission rate 120, 220 is adjusted to not exceed the allowed transmission rate (ATR). For example, according to one embodiment, the transmission rate 120, 220 is adjusted so that it does not exceed and remains a small amount below the estimation of the modem drain rate 140, 240. By keeping a transmission rate 120, 220 below the adjusted transmission rate, as will become more evident, the modem buffer backlog is allowed to drain completely over time. According to one embodiment, the allowed transmission rate for respective transmission rates 120, 220 is adjusted gradually, for example, using an algorithm, such as algorithm 1 depicted below, so as to not overreact to new monitored information that pertains to modem drain rate. Referring to algorithm 1, NATR stands for the new allowed transmission rate that results from adjusting, CATR stands for the current allowed transmission rate, EMDR stands for the estimation of the modem drain rate, and beta is set to a value that enables buffer buildup to drain over time. According to one embodiment, alpha is a number between 0.1 and 0.9. According to one embodiment, alpha is 0.2. According to one embodiment, beta is a constant number between 0.95 to 0.98.

$$NATR=(1-alpha)\times CATR+(EMDR*beta)\times alpha \quad \text{algorithm 1}$$

According to one embodiment, algorithm 1 provides a trades-off between utilization (beta close to 1) and fast drain rate (beta<<1).

According to one embodiment, modem buffer occupancy is used as a part of adjusting transmission rates 120, 220. For example, an estimation of modem buffer occupancy can be employed by changing the constant beta to be a function of buffer occupancy, so as to adaptively achieve higher modem buffer utilization when the modem buffer occupancy is low, and increase the modem drain rate when the modem buffer occupancy is high. For example, if an estimation of modem buffer occupancy, as represented by "b," can potentially be in the range of [0 1], where a value of 0 for the estimated modem buffer occupancy "b" indicates that the modem buffer is empty and a value of 1 for estimated modem buffer occupancy "b" indicates that the modem buffer is full or overflowing, then, the algorithm 2 as depicted below, can be used to adaptively increase modem buffer utilization when modem buffer occupancy is low and increase the modem drain rate when the modem buffer occupancy is high.

$$NATR=(1-alpha)\times CATR+alpha\times(EMDR*beta(b)) \quad \text{algorithm 2}$$

As depicted in algorithm 2, beta(b) is a monotonic decreasing function of the estimated modem buffer occupancy b. According to one embodiment, beta(b) is implemented using algorithm 3 as depicted below:

$$beta(b)=1-b \quad \text{algorithm 3}$$

For algorithm 3, when the estimated modem buffer occupancy "b" is small, beta(b) will result in a value of 1 to provide high modem buffer utilization, and when the estimated modem buffer occupancy "b" is dose to 1, beta(b) will cause the modem drain rate to increase. Other monotonic functions can also be used for calculating beta(b), such as algorithm 4 depicted below:

$$\text{beta}(b)=0.89(1-\text{sqrt}(b))+0.1 \qquad \text{algorithm 4}$$

According to one embodiment for algorithm 4, the calculation of beta(0) provides a value of 0.99 and the calculation of beta(1) provides a value of 0.1. According to one embodiment, a square-root function as depicted in algorithm 4 can be used for adjusting beta more aggressively than the linear function depicted in algorithm 3.

According to one embodiment, algorithms 1 and 2 use first-order auto-aggressive implementations to provide a smoothing filter. Other forms of smoothing filters, such as windowing provided by algorithm 5 below, can be used.

$$\text{NATR}(n)=\tfrac{1}{3}\times\text{EMDR}(n)\text{EMDR}(n-1)+\text{EMDR}(n-2)) \qquad \text{algorithm 5}$$

Referring to FIG. 2, as stated herein, according to one embodiment, a modern buffer 230 can receive data from two data sources 210, 270. The data from the two data sources 210, 270 may be transmitted at different transmission rates 220, 280. Transmitted data may be prioritized based on the type of data or the type of data source 210, 270 that provides the transmitted data, among other things. For example, video data from video transmitter 210 can be provided a higher priority than non-video data from another data source 270. The router 260 can use the assigned priorities to determine the order in which respective data is communicated to the modem buffer 230. The transmission rates 220, 280 can be adjusted separately based on the priorities. For example, according to one embodiment, the transmission rates 220, 280 are adjusted so that the total of the transmission rates 220, 280 of the data that is received by the router 260 from the two data sources 210, 270 does not exceed a total allowed transmission rate (ATR). According to one embodiment, an allowed transmission rate (ATR) that is calculated using any of algorithms 1, 2 or 5 is used as the total allowed transmission rate (TATR).

The transmission rate 220 for video data, according to one embodiment, is provided a higher percentage of the total allowed transmission rate (ATR) than the transmission rate 280 for non-video data. For example, the transmission rate 280 for the non-video data may be adjusted to a small delta and the transmission rate 220 for the video data (TRVD) may be adjusted to not exceed the total allowed transmission rate (TATR) minus the small delta as depicted in algorithm 6 below:

$$\text{TRVD}=\text{TATR}-\text{delta} \qquad \text{algorithm 6}$$

Therefore, various embodiments are well suited to cooperatively adjust multiple transmission rates 220, 280 for multiple data sources 210, 270. For example, as described herein, the transmission rates 220, 280 are adaptively adjusted so that the total of the transmission rates 220, 280 does not exceed the total allowed transmission rate (TATR). According to one embodiment, the transmission rate 280 for non-video data is provided a high percentage of the estimation of the modem drain rate 240 when no video data is being received. For example, when the modem buffer 230 is not receiving any video data, the transmission rate 280 for non-video data may be adjusted to the difference between the total allowed transmission rate (TATR) minus a small delta. However, when the modem buffer 230 is receiving video data from video transmitter 210, the transmission rates 220 and 280 are adjusted using algorithm 2, as described herein.

According to various embodiments, the data source 270 can transmit data because the data source 270's transmission rate 280 is assigned a small delta while at the same time a user of video transmitter 210 can be provided a high quality viewing experience because the video transmitter 210's transmission rate 220 is adaptively adjusted based on the difference between the total allowed transmission rate (TATR) minus the small delta.

According to one embodiment, conventional QoS limiting mechanisms are used as a part of adjusting the transmission rate 280 for non-video data to reduce communication delay. For example, if the data source 270 transmits non-video data at a higher rate than it is allotted by the delta depicted in algorithm 2, then the router 260, according to one embodiment, will drop packets from the non-video data. Assuming that the data source 270 is using a modern TCP implementation, the standard TCP control mechanisms will react to the router 260's packet dropping by reducing the transmission rate 280 of the non-video data. However, since packet dropping is not acceptable for video data, various embodiments provide for adjusting the transmission rate 220 of video data to reduce the probability of dropping video packets. For example, as described herein, a new adjusted transmission rate (ATR) is determined based on an estimation of the modem drain rate 240. The video transmitter 210 adjusts the transmission rate 220 based on the new adjusted transmission rate (ATR) to reduce the probability that video packets are dropped.

Although various embodiments are described in the context of only one video transmitter transmitting video data, various embodiments are well suited to cooperatively adjust multiple transmission rates for multiple video transmitters. The transmission rates of a plurality of video transmitters can be adjusted based on estimation of the modem drain rate. As described herein, allowed transmission rate (ATR), as depicted in algorithms 1, 2, 5, or transmission of video data (TRVD), as depicted in algorithm 6, can be used for adjusting a transmission rate 120, 220, 280. ATR can be used for example, when none of the data sources are transmitting non-video data. TRVD and delta can be used when any of the data sources are transmitting non-video data. For example, depending on whether any of the data sources are transmitting non-video data, the transmission rate of video data from a plurality of video transmitters can be adjusted to equal proportions of the allowed transmission rate (ATR), as depicted in algorithms 1, 2, 5, or to equal proportions of the transmission of video data (TVRD), as depicted in algorithm 6. In another example, two different streams of video data may have different priorities, In this case, the transmission rates of the two streams of video data can be adjusted to not exceed different proportions of the allowed transmission rate (ATR). For example, transmission rate A for one video stream may be adjusted to not exceed 40% of the allowed transmission rate (ATR) while transmission rate B for a second video stream may be adjusted to not exceed 60% of the allowed transmission rate (ATR). By adaptively adjusting the transmission rates based on the estimation of the modem drain rate, for example using an allowed transmission rate (ATR), the transmission rates can be controlled to reduce the probability that the modem buffer will overflow causing delays in video traffic. Similarly, similarly portions of a transmission rate for video data (TRVD) and portions of a delta can be allotted to a plurality of video data sources and a plurality of non-video data sources communicating for example with a router 260.

Any one or more of various embodiments that are used for adjusting a transmission rate 120, 220 can be used as a part of adjusting a transmission rate 280. In one example, transmission rates 120, 220 are adjusted based on an allowed transmission rate (ATR) that is calculated based on an estimation of the modem drain rate 140, 240 using an algorithm 1, 2, or 5. The transmission rate 280 can be adjusted to a small delta of an allowed transmission rate (ATR) that is calculated based on an estimation of the modem drain rate 240 using algorithm 6.

Figure 3:
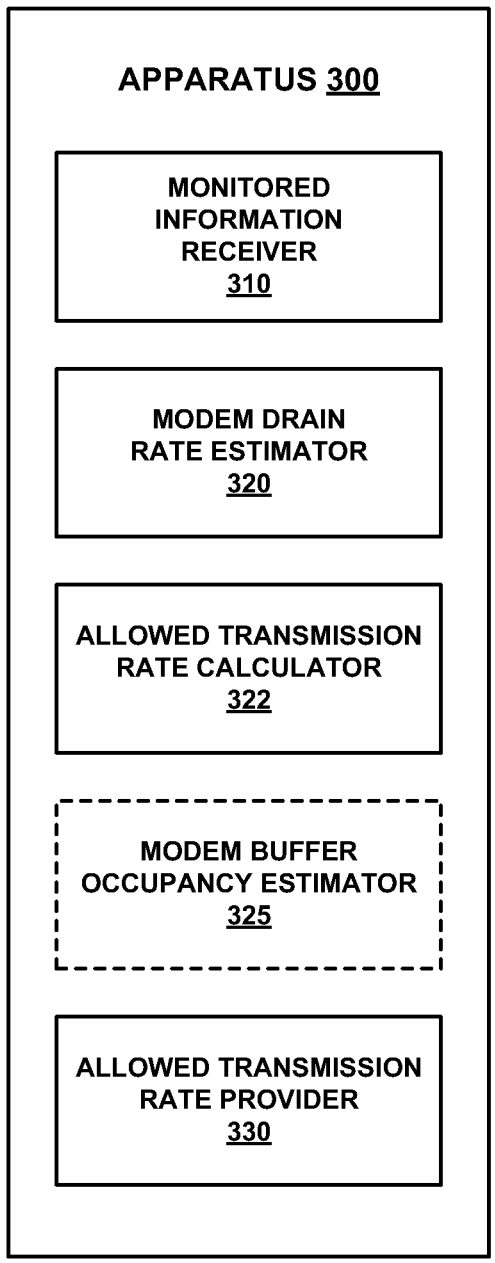
FIG. 3 depicts a block diagram of an apparatus for reducing communication delay of video data, according to one embodiment.

FIG. 3 depicts a block diagram of an apparatus 300 for reducing communication delay of video data, according to one embodiment. The blocks that represent features in FIG. 3 can be arranged differently than as illustrated, and can implement additional or fewer features than what are described herein. Further, the features represented by the blocks in FIG. 3 can be combined in various ways. The apparatus 300 can be implemented using hardware, hardware and software, hardware and firmware, or a combination thereof.

The apparatus 300 includes a monitored information receiver 310 (also referred to as the "receiver"), a network buffer drain rate estimator 320 (also referred to as the "estimator 320"), an allowed transmission rate calculator 322 (also referred to herein as "calculator 322), an allowed transmission rate provider 330 (also referred to as the "provider"), and optionally a modem buffer occupancy estimator 325 (also referred to as the "estimator 325").

According to one embodiment, the apparatus 300 includes the modem drain rate estimator 320 but not the modem buffer occupancy estimator 325. According to another embodiment, the apparatus 300 includes the modem buffer occupancy estimator 325 but not the modem drain rate estimator 320, According to another embodiment, the apparatus 300 includes both estimators 320 and 325.

The apparatus 300 shall be described in the context of FIG. 1. The monitored information receiver 310 is configured for receiving monitored information that pertains to a network buffer drain rate 140 of the network buffer 130. The network buffer drain rate 140 is a rate that video data is removed from the network buffer 130. The network buffer drain rate estimator 320 is configured for estimating the network buffer drain rate 140 based on the monitored information. The allowed transmission rate calculator 322 configured for calculating an allowed transmission rate (ATR) based on the estimation of the network buffer drain rate 140. The allowed transmission rate provider 330 configured for providing the allowed transmission rate (ATR) to a video transmitter 110 to adjust a transmission rate of future video data to not exceed the allowed transmission rate (ATR). In the event that the apparatus 300 includes a modem buffer occupancy estimator 325, the modem buffer occupancy estimator 325 can use information, such as packet dispersions or timed data or a combination thereof, received by the receiver 310 to estimate modem buffer occupancy. The allowed transmission rate calculator 322 can calculate an allowed transmission rate using the estimated modem drain rate and the estimated modem buffer occupancy using an algorithm, such as algorithm 2 where beta(b) depicted in algorithm 2 is calculated using either algorithm 3 or 4, among other things.

Referring to FIGS. 1 and 2, the apparatus 300 depicted on FIG. 3 can reside at a video transmitter 110, 210, a data source 270, which may or may not transmit video data, a video receiver 150, 250, a data receiver 290, which may or may not receive video data, or a router 260, among other things.

Figure 4:
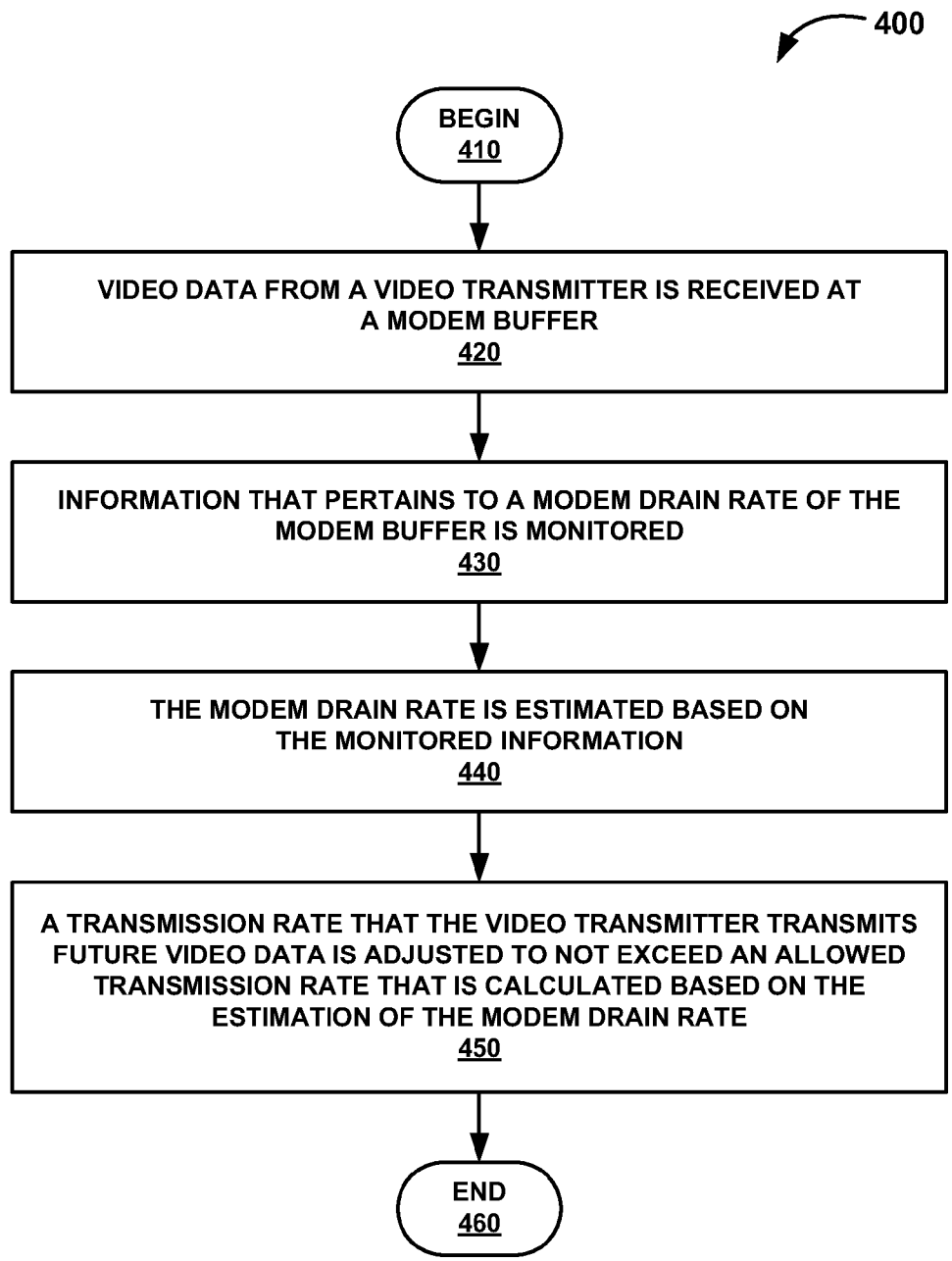
FIG. 4 depicts a flowchart of a method of reducing communication delay of video data, according to one embodiment.

FIG. 4 depicts a flowchart of a method of reducing communication delay of video data, according to one embodiment. Although specific operations are disclosed in flowchart 400, such operations are exemplary. That is, embodiments of the present invention are well suited to performing various other operations or variations of the operations recited in flowchart 400. It is appreciated that the operations in flowchart 400 may be performed in an order different than presented, and that not all of the operations in flowchart 400 may be performed.

At 410, the method begins.

At 420, a modem buffer receives current video data from a video transmitter. For example, referring to FIG. 1, assume that the video transmitter 110 transmits video data to the modem buffer 130. The modem buffer 130 receives the video data from the video transmitter 110.

At 430, information that pertains to a modern drain rate of the modem buffer is monitored. The modem drain rate 140 is a rate that the video data is removed from the modem buffer 130. For example, still referring to FIG. 1, assume that a frame of video data results in a burst of seven packets and those seven packets are in the modem buffer 130. According to one embodiment, packet dispersion is the amount of time between the packets that are removed consecutively from a modem buffer 130. For example, if the first packet is removed at time t1, the second packet is removed at time t2 and a third packet is removed at time t3, the dispersion between the first and second packet is the difference d1 between time t2 and time t1 and the dispersion between the second and third packet is the difference d2 between time t3 and time t2. In the example of seven packets for a frame, there would be six differences d1-d6 for seven times t1-t7 that the seven packets are removed from the modem buffer. The differences d1-d6 and the size of the seven packets are examples of information that pertains to a modem drain rate 140. Although various embodiments are described in the context of seven packets, embodiments are well suited to using few packets, such as six packets.

Embodiments pertaining to RTCP can be used as a part of determining packet dispersion, as discussed herein. The monitored information could include any one or more of standard RTP information, RTCP information, extensions thereof, TCP information, or a combination thereof, as described herein, and feedbacks to obtain information for estimating the modem drain rate 240

At 440, the modern drain rate is estimated based on the monitored information. For example, referring to FIG. 1, an apparatus 300, which resides at the video receiver 140 or at the video transmitter 110, could receive the information that pertains to the modem drain rate 140, which is monitored in operation 430, The apparatus 300 can use the received monitored information to estimate a modern drain rate 140. According to one embodiment, the modem drain rate 140 can be estimated by dividing the average dispersion by the average packet size. In this case, the modem drain rate 140 could be estimated by dividing the average of the differences d1-d6 between the times t1-t7 by the average size of the seven packets. Although various embodiments are described in the context of seven packets, embodiments are well suited to using more or few packets. For example, six packets can be used instead of seven packets.

At 450, a transmission rate that the video transmitter transmits future video data is adjusted to not exceed an allowed transmission rate (ATR) that is calculated based on an estimation of the modem drain rate. Continuing the example and referring to FIG. 1, the apparatus 300 can use the estimation of the modem drain rate 140, determined in operation 440, to calculate an allowed transmission rate (ATR) using algorithm 1. The apparatus 300 can use algorithms, such as algorithms 1-6, to calculate an allowed transmission rate (ATR). The apparatus 300 can cause the transmission rate 120 to be adjusted so that the transmission rate 120 does not exceed the allowed transmission rate (ATR). For example, if the allowed transmission rate (ATR) is determined by the video receiver 150, the video receiver 150 can communicate the allowed transmission rate (ATR) to the video transmitter 110. The video transmitter 110 can adjust the transmission rate 120 based on the received allowed transmission rate (ATR). Alternatively, an apparatus 300 that resides at the video transmitter 110 can calculate the allowed transmission rate (ATR). In this case, the video transmitter 110 can adjust the transmission rate 120 to not exceed the allowed transmission rate (ATR).

At 460, the method ends.

Various embodiments provide for continuing to monitor the information pertaining to the modem drain rate 140, estimating the modem drain rate 140 and adjusting the transmission rate 120 based on an allowed transmission rate (ATR) during the transmission of video data, as described herein.

Various embodiments provide for a communication loop between receivers 150 and video transmitters 110. For example, information pertaining to modem drain rate 140 can be communicated from a video receiver 150 to a video transmitter 110. The video transmitter 110 can estimate a modem drain rate 140 based on the received information, determine an allowed transmission rate (ATR) based on the estimation of the modem drain rate and transmit video data at a transmission rate 120 that is adjusted to not exceed the ATR. Alternatively, the video receiver 150 can estimate a modem drain rate 140 and determine an ATR based on the estimation of the new modem drain rate 140 and communicate the ATR to a video transmitter 110. The video transmitter 110 can transmit video data at a transmission rate 120 that is adjusted to not exceed the received ATR that it received.

Although the above example was described in the context of a single data source—video transmitter 110 (FIG. 1)—embodiments are well suited to a system 200 with multiple data sources 210, 270 as depicted in FIG. 2. For example, one person at a home can cause a video to be transmitted, from a video transmitter 210, while another person in the same home may cause web pages to be uploaded from another data source 270, at the same home, to a data receiver 290, such as a web site. An embodiment with a plurality of data sources 210, 270 as depicted in FIG. 2 shall be described in the context of flowchart 300. Assume for the sake of illustration that the apparatus 300 resides at the router 260.

At 410, the method begins.

At 420, a modem buffer receives current video data from a video transmitter. For example, assume that the video transmitter 210 transmits high definition video to the modem buffer 230 through the router 260. The modem buffer 230 receives the high definition video data from the video transmitter 260

At 430, information that pertains to a modem drain rate of the modem buffer is monitored. The modem drain rate 240 is a rate that the data is removed from the modem buffer 230. For example, according to one embodiment, router logic that resides at the router 260 could monitor any one or more of standard RTP information, RTCP information, extensions thereof, TCP information, or a combination thereof, as described herein, and feedbacks to obtain information for estimating the modem drain rate 240, as described herein. For example, and as described in more detail herein, the router logic could store the packet transmission time that the router 260 transmits a packet to the modem buffer 230. The router 260 will receive feedback that corresponds to the transmitted packet which includes a packet reception time that the video receiver 250 received the packet. The packet transmitted time and the packet reception time are examples of information that pertains to a modem drain rate 240.

In this illustration, the router logic and the apparatus 300 reside at the router 260. The router logic, which monitors the information, may or may not be a part of the apparatus 300. For example, the router logic may reside at the router 260 but not be a part of the apparatus 300. Alternatively, the router logic may be a part of the apparatus 300.

At 440, the modem drain rate is estimated based on the monitored information. Continuing the example, referring to FIG. 2, an apparatus 300, which resides at the router 260, could receive the information that pertains to the modem drain rate 240, which is monitored at operation 430. The apparatus 300 can use the received monitored information to estimate a modem drain rate 240. According to one embodiment, the modem drain rate 240 can be estimated by dividing the average dispersion by the average packet size. In this case, the modem drain rate 240 could be estimated by dividing the average of the differences d1-d6 between the times t1-t7 by the average size of the seven packets. Although various embodiments are described in the context of seven packets, embodiments are well suited to using more or few packets. For example, six packets can be used instead of seven packets.

At 450, a transmission rate that the video transmitter transmits future video data is adjusted to not exceed an allowed transmission rate (ATR) that is calculated based on the estimation of the modem drain rate. Assuming that the apparatus 300 resides on the router 260, the apparatus 300 can calculate an allowed transmission rate (ATR) based on the estimation of the modem drain rate 240 using an algorithm, such as algorithms 1-6. Referring to algorithm 6, the apparatus 300 at router 260 can calculate a first allowed transmission rate for data source 270 and a second allowed transmission rate for video transmitter 210 using algorithm 6 described herein. For example, a total allowed transmission rate (ATR) determined with any one or more of algorithms 1, 2 or 5, among other things. Algorithm 6 can be used for calculating the first allowed transmission rate and the second allowed transmission rate. The first allowed transmission rate can be set to the delta. The second allowed transmission rate can be set to the transmission rate for the video data (TRVD), which is the difference between the total allowed transmission rate (TATR) and the delta. The router 260 can communicate the respective first and second allowed transmission rates to the data source 270 and the video transmitter 210. The video transmitter 210 can adjust the transmission rate 220 of the video date to not exceed the second allowed transmission rate. According to one embodiment, conventional QoS limiting mechanisms are used as a part of adjusting the transmission rate 280 of non-video data to not exceed the first allowed transmission rate, as described herein.

At 460, the method ends.

Although the second description of flowchart 400 assumed that the apparatus 300 resided at the router 260, various embodiments discussed in the second description of flowchart 400 are also well suited for an apparatus 300 residing in other locations, such as the video transmitter 210, the video receiver 250, among other things. For example, the information pertaining to modem drain rate 240 can be communicated to or obtained at an apparatus 300 that resides at the video transmitter 210 and a data source 270. In another example, information pertaining to modem drain rate 240 can be communicated to or obtained at a video receiver 250.

Various embodiments provide for continuing to monitor the information pertaining to the modem drain rate 240, estimating the modem drain rate 240 and adjusting the transmission rate 220 during the transmission of video data, as described herein.

Figure 5:
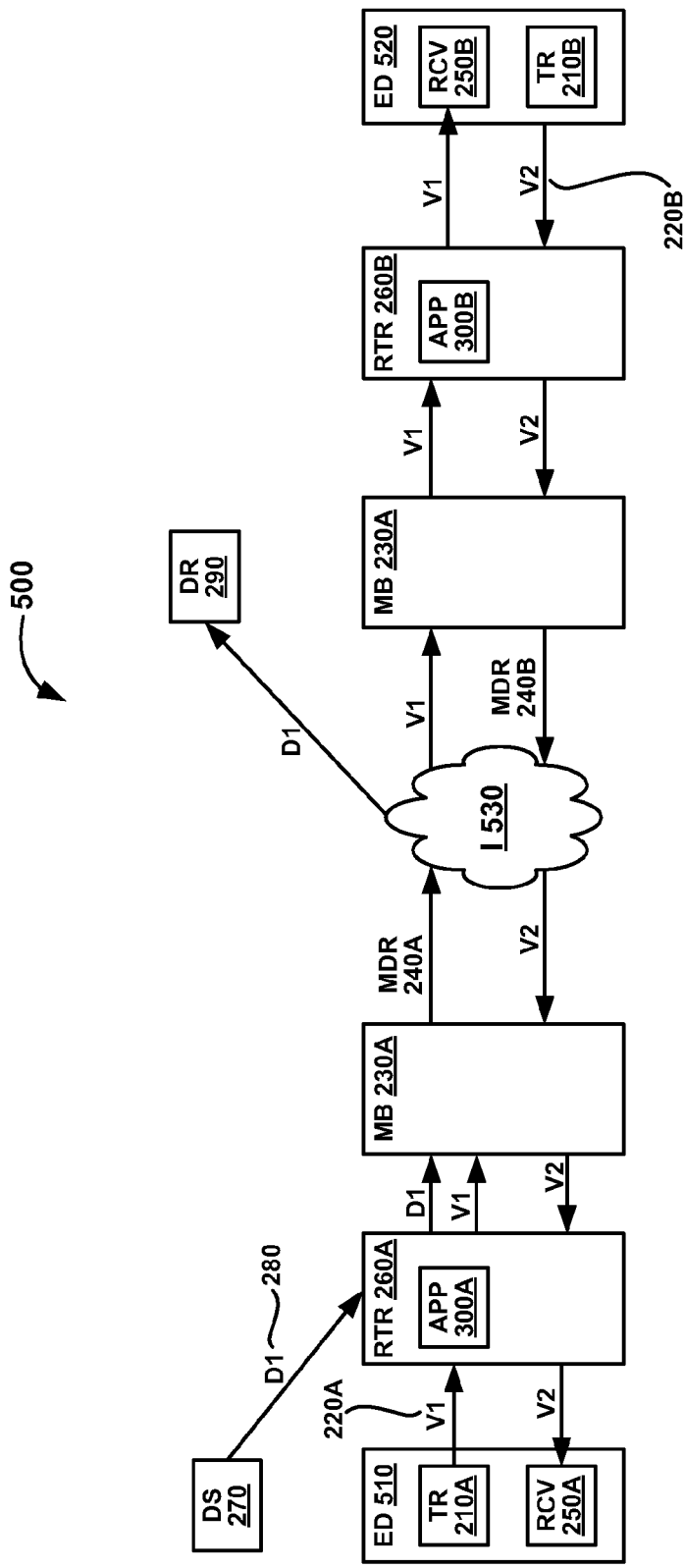
FIG. 5 depicts a system for reducing communication delay of video, according to one embodiment, using video conferencing.

FIG. 5 depicts a system 500 for reducing communication delay of video data, according to one embodiment. According to one embodiment, FIG. 5 depicts a system 500 for video conferencing between two electronic devices 510 and 520, using Skype™ or Google™ chat, among other things. The system 500 includes two electronic devices 510 and 520 that both include respectively a transmitter 210A, 210B and a receiver 250A, 250B. The system also includes routers 260A, 260B, modem buffers 230A, 230B, a network 530, a data source 270 and a data receiver 290. Data source 270, electronic device 510, router 260A and modem buffer 230A are on one side of a network 530 while electronic device 520, router 260B and modem buffer 230A are on the other side of a network 530. The modem buffers 230A, 230B include two parts for the two directions of data flow. For example, a first part of modem buffer 230A is used for receiving d1 and v1 and transmitting d1 and v2. A second part of modem buffer 230A is used for receiving v2 and transmitting v2. The routers 260A, 260B include respective apparatuses 300A, 300B. The apparatuses 300A, 300B are examples of apparatuses 300 (FIG. 3), according to one embodiment. The video transmitters 210A, 210B and the video receivers 250A, 250B are examples respectively of the video transmitter 210 and video receiver 250 depicted in FIG. 2. The modem buffers 230A, 230B are examples of a modem buffer 230 depicted in FIG. 2.

The electronic devices 510 and 520 can transmit and send data V1, V2 to each other through their respective routers 260A, 260B, modem buffers 230A, 230B, and the network 530. For example, electronic device 510 can transmit video v1 to electronic device 520 and electronic device 520 can transmit video v2 to electronic device 510. The optional data source 270, according to one embodiment, transmits optional non-video data d1 to the optional data receiver 290 through the router 260A and buffer 230A. Video v1 is transmitted at transmission rate 220A, optional data d1 is transmitted at transmission rate 280, and video v2 is transmitted at transmission rate 220B.

Various embodiments described herein are used for reducing communication delay of video data. For example, assuming that the data source 270 is not transmitting data d1, the apparatuses 300A, 300B on the routers 260A, 260B can receive packet dispersion information or time data information, or a combination thereof, as described herein, and estimate the respective modem drain rates 240A, 240B or modem buffer occupancy for the respective modem buffers 230A, 230B. The apparatuses 300A, 300B can calculate allowed transmission rate (ATR)s based on estimations of the modem drain rates 240A, 240B using an algorithm, such as algorithm 1, 2 or 5, among other things.

If the data source 270 is transmitting data d1, the ATR calculated using algorithm 1, 2 or 5, can be used as a total ATR and the apparatus 300A can calculate a first and a second allowed transmission rates using algorithm 6, as described herein. For example, apparatus 300A can set the first allowed transmission rate for data source 270 to be equal to the delta and a second allowed transmission rate for electronic device 510 to be equal to the TVRD as depicted in algorithm 6. The router 260A can adjusted data source 270's transmission rate 280 of data d1 to not exceed the first allowed transmission rate using conventional QoS limiting mechanisms, as described herein. The router 260A can communicate the second allowed transmission rate to electronic device 510's transmitter 210A. The video transmitter 210A can adjust its transmission rate 220A to not exceed the second allowed transmission rate.

Although the apparatuses 300A, 300B are depicted on the routers 260A, 260B, they can be other places. For example, receiver 250A could communicate information, such as time data information or packet dispersion information, to an apparatus 300 that resides on electronic device 520 instead of on router 260B, among other things.

Any one or more of the embodiments described herein can be implemented using computer readable storage medium and computer-executable instructions which reside, for example, in computer readable storage medium of a computer system or like device. The computer readable storage medium can be any kind of memory that instructions can be stored on. Examples of the computer readable storage medium include but are not limited to a disk, a compact disk (CD), a digital versatile device (DVD), read only memory (ROM), flash, and so on. As described above, certain processes and operations of embodiments of the present invention are realized, in one embodiment, as a series of instructions (e.g., software program) that reside within computer readable storage medium of a computer system and are executed by the processor of the computer system. When executed, the instructions cause the computer system to implement the functionality of the embodiments of the present invention.

According to one embodiment, a computer readable storage medium has computer-readable program instructions stored thereon for causing a computer system to perform a method of reducing communication delay of video data, where the method comprising receiving 420, from a first transmitter 110, the video data at a network buffer 130; monitoring 430 information that pertains to network buffer drain rate 140 and pertains to network buffer occupancy, wherein the network buffer drain rate 140 is a rate that the video data is removed from the network buffer 130 and wherein the network buffer occupancy is an amount of data that resides in the network buffer 130; and reducing a probability of network buffer build up in the network buffer 130 by providing the monitored information to an apparatus 300 that calculates an allowed transmission rate for the first transmitter 110 based on the monitored information.

Various embodiments provide for monitoring and controlling communication delays while communicating high quality video.

Conventional usage of RTCP provides information pertaining to statistical losses and coarse grained delay measurements. A conventional implementation is to adjust bit-rate according to loss rate only, which does not guarantee low-delay. Instead, many implementations adapt to increase delay by reactively delaying the playback timeline, resulting in prolonged periods of high-delay. Extended RTCP provides finer grained reports on loss data, but does not provide mechanisms to avoid delay buildup. Conventional methods wait until packets of HD video data are lost, but then it is too late to provide a high quality viewing experience.

Various embodiments allow low-delay high bit-rate video conferencing using commonly available broadband access methods, such as cable or DSL, even with other concurrent traffic, such as a large file transfer.

According to one embodiment, an apparatus 300 reduces the possibility of modem overflow and high delay. According to one embodiment, adjusting one or more transmission rates for data received by a modem buffer actively minimizes modem buffer overflow and provides low-delay.

Various embodiments provide for straightforward detection of violations based on clear responses of components according to observable conditions. Examples of clear responses include, among other things, TCP ACKS, two-way RTCP traffic, and monitored dispersions, as described herein. Examples of observable conditions include, among other things, information pertaining to modem drain rate, as described herein.

Various embodiments provide for reducing communication delay of video data due to modem buffer build-up or overflow, without tracking or assigning memory addresses associated with any entity, such as a transmitter, a receiver, a router or a modem buffer. For example, various embodiments provide for adjusting a transmission rate based on an estimation of the modem drain rate where the modem drain rate is estimated without requiring information pertaining to memory addresses.

Various embodiments provide for reducing the probability of modem buffer overflow and, thus, reducing communication delay without requiring information pertaining to the size of the modem buffer.

Various embodiments have been described in various combinations. However, any two or more embodiments may be combined. Further, any embodiment may be used separately from any other embodiments.

Example embodiments of the subject matter are thus described. Although various embodiments of the subject matter have been described in a language specific to structural features and/or methodological acts, it is to be understood that the appended claims are not necessarily limited to the specific features or acts described above. Rather, the specific features and acts described above are disclosed as example forms of implementing the claims.

What is claimed is:

1. A method of reducing communication delay of video data from a video transmitter to a video receiver, the method comprising:
receiving at a network buffer video data from the video transmitter;
monitoring information that pertains to a network buffer drain rate of the network buffer, wherein the network buffer drain rate is a rate that the video data is removed from the network buffer;
estimating the network buffer drain rate based on the monitored information; and
adjusting that the video transmitter transmits future video data to not exceed an allowed transmission rate (ATR) that is calculated based on the estimation of the network buffer drain rate,
wherein the monitoring of the information further comprises directly monitoring an amount of time it takes for a packet of the video data to be communicated through the network buffer, the network buffer located external to and between the video transmitter and the video receiver,
and wherein the estimating of the network buffer drain rate further comprises estimating the network buffer drain rate based at least on estimating a variation in the amount of time it takes for the packet of the video data to be communicated through the network buffer.

2. The method according to claim 1, wherein:
the monitoring of the information further comprises monitoring the amount of video data received from the network buffer and the amount of time between packets associated with the video data; and
the estimating of the network buffer drain rate further comprises estimating the network buffer drain rate based, at least in part, on the amount of video data and the amount of time between the packets.

3. The method according to claim 1, wherein:
the monitoring of the information further comprises monitoring a round trip time associated with a received packet of the video data; and
the estimating of the modem data rate further comprises estimating the network buffer drain rate based, at least in part, on estimating variation on the round trip time.

4. An apparatus for reducing communication delay of video data between a video transmitter and a video receiver, the apparatus comprising:
a processor;
monitored information receiver configured for receiving monitored information that pertains to a network buffer drain rate of a network buffer, wherein the network buffer drain rate is a rate that video data is removed from the network buffer;
network buffer drain rate estimator configured for estimating the network buffer drain rate based on the monitored information;
allowed transmission rate calculator configured for calculating an allowed transmission rate (ATR) based on the estimation of the network buffer drain rate; and
allowed transmission rate provider configured for providing the allowed transmission rate to the video transmitter to adjust a transmission rate of future video data to not exceed the allowed transmission rate (ATR),
wherein the monitored information comprises a directly monitored amount of time it takes for a packet of the video data to be communicated through the network buffer, the network buffer located external to and between the video transmitter and the video receiver,
and wherein the network buffer drain rate estimator is to estimate the network buffer drain rate based at least on estimating a variation in the amount of time it takes for the packet of the video data to be communicated through the network buffer.

5. The apparatus according to claim 4, wherein the apparatus is located at an electronic device selected from a group consisting of the video transmitter, the video receiver, and a router.

6. The apparatus according to claim 4, wherein the apparatus is located at a router that is a Quality of Service router.

7. The apparatus according to claim 4, wherein the calculated allowed transmission rate (ATR) is a total allowed transmission rate (ATR) and wherein the allowed transmission rate provider is further configured for providing a plurality of new allowed transmission rates for a plurality of data sources where a total of the plurality of the new allowed transmission rates does not exceed the total allowed transmission rate (ATR).

8. The apparatus according to claim 4, wherein the apparatus further comprises a network buffer occupancy estimator that is configured for estimating a network buffer occupancy, which is an amount of data that resides in the network buffer and wherein the allowed transmission rate provider is further configured for causing a reduction in a probability of network buffer occupancy build up by providing the allowed transmission rate, that is based on the estimated network buffer occupancy and the estimation of the network buffer drain rate, to the video transmitter.

9. The apparatus according to claim 4, wherein:
the monitored information receiver is further configured for monitoring the amount of video data received from the network buffer and the amount of time between packets associated with the video data; and
the network buffer drain rate estimator is further configured for estimating the network buffer drain rate based, at least in part, on the amount of video data and the amount of time between the packets.

10. A computer readable storage medium having computer-readable program instructions stored thereon for causing a computer system to perform a method of reducing communication delay of video data, the method comprising:
- receiving, from a first transmitter, the video data at a network buffer;
- monitoring information that pertains to network buffer drain rate and pertains to network buffer occupancy, wherein the network buffer drain rate is a rate that the video data is removed from the network buffer and wherein the network buffer occupancy is an amount of data that resides in the network buffer; and
- reducing a probability of network buffer build up in the network buffer by providing the monitored information to an apparatus that calculates an allowed transmission rate for the first transmitter based on the monitored information,
- wherein the monitoring of the information further comprises directly monitoring an amount of time it takes for a packet of the video data to be communicated through the network buffer, the network buffer located external to and between the first transmitter and a video receiver,
- and wherein reducing the probability of network buffer build up comprises estimating the network buffer drain rate based at least on estimating a variation in the amount of time it takes for the packet of the video data to be communicated through the network buffer.

11. The computer readable storage medium according to claim 10, wherein the receiving of the video data further comprises:
- receiving the video data from a Quality of Service (QOS) router.

12. The computer readable storage medium according to claim 10:
- wherein the method further comprises receiving, at the network buffer, second data from a second transmitter; and
- wherein an apparatus, which resides at a router, provides a second transmission rate, which is a small delta of the allowed transmission rate (ATR), to the second transmitter and provides a first transmission rate, which is adjusted to a difference between the allowed transmission rate (ATR) and the small delta, to the first transmitter.

13. The computer readable storage medium according to claim 10, wherein the receiving of the video data further comprises:
- receiving the video data in real time.

14. The computer readable storage medium according to claim 10, wherein:
- the monitoring of the information further comprises monitoring an amount of the video data received from the network buffer and an amount of time between packets associated with the video data; and
- the estimating of the network buffer occupancy further comprises determining packet dispersion by estimating the network buffer occupancy based, at least in part, on the amount of the video data and the amount of time between the packets.

* * * * *

UNITED STATES PATENT AND TRADEMARK OFFICE
CERTIFICATE OF CORRECTION

PATENT NO. : 8,634,300 B2  
APPLICATION NO. : 13/386633  
DATED : January 21, 2014  
INVENTOR(S) : Wai-Tian Tan et al.

Page 1 of 1

It is certified that error appears in the above-identified patent and that said Letters Patent is hereby corrected as shown below:

In the Claims:

In column 17, line 40, in Claim 1, after "adjusting" insert -- a transmission rate --.

In column 18, line 20, in Claim 4, after "rate" insert -- (ATR) --.

In column 18, line 38, in Claim 6, after "Service" insert -- (QOS) --.

Signed and Sealed this
Twenty-seventh Day of May, 2014

Michelle K. Lee
*Deputy Director of the United States Patent and Trademark Office*